United States Patent
Nishizawa

(10) Patent No.: US 8,139,247 B2
(45) Date of Patent: Mar. 20, 2012

(54) INFORMATION PROCESSING APPARATUS, SYSTEM, AND METHOD THAT PROVIDE JOB RESERVATION WITH A TIME-OUT FEATURE

(75) Inventor: Ayako Nishizawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 1104 days.

(21) Appl. No.: 11/564,657

(22) Filed: Nov. 29, 2006

(65) Prior Publication Data
US 2007/0127054 A1 Jun. 7, 2007

(30) Foreign Application Priority Data

Dec. 5, 2005 (JP) ................................ 2005-351311

(51) Int. Cl.
*G06F 3/12* (2006.01)
(52) U.S. Cl. .......... 358/1.15; 358/1.13; 399/87; 710/17; 710/18; 710/264
(58) Field of Classification Search ................. 396/429; 358/1.1, 1.15, 1.16; 709/229; 710/17, 18, 710/264; 399/87
See application file for complete search history.

(56) References Cited

U.S. PATENT DOCUMENTS

| | | | | |
|---|---|---|---|---|
| 6,785,727 B1* | 8/2004 | Yamazaki | ................ | 709/229 |
| 7,284,061 B2* | 10/2007 | Matsubayashi et al. | ...... | 709/229 |
| 2002/0021902 A1* | 2/2002 | Hosoda et al. | ................ | 396/429 |
| 2002/0054350 A1* | 5/2002 | Kakigi et al. | ................ | 358/1.16 |
| 2003/0208607 A1* | 11/2003 | Yamazaki | ................ | 709/229 |
| 2004/0190049 A1* | 9/2004 | Itoh | ................ | 358/1.15 |
| 2004/0257610 A1* | 12/2004 | Itoh et al. | ................ | 358/1.15 |
| 2004/0263870 A1* | 12/2004 | Itoh et al. | ................ | 358/1.1 |
| 2005/0021795 A1* | 1/2005 | Kuroshima et al. | ................ | 709/229 |
| 2005/0179944 A1* | 8/2005 | Gassho et al. | ................ | 358/1.16 |

FOREIGN PATENT DOCUMENTS

| | | |
|---|---|---|
| JP | 2000-047530 A | 2/2000 |
| JP | 2003-18337 A | 1/2003 |

OTHER PUBLICATIONS

Office Action issued in corresponding Japanese Patent Application No. 2005-351311 dated Dec. 20, 2010.

* cited by examiner

*Primary Examiner* — Twyler Haskins
*Assistant Examiner* — Nicholas Pachol
(74) *Attorney, Agent, or Firm* — Rossi, Kimms & McDowell LLP

(57) ABSTRACT

In an image processing apparatus which allows a plurality of users to reserve jobs, the convenience of each user is further improved while ensuring security of a job to be output by each user. In order to achieve this object, an MFP according to the invention is characterized by including a registration unit (204-1) which registers the use order of the image processing apparatus based on the acceptance order of the user identifier, a notification unit (204-4) which notifies a specific user of permission to use in accordance with the use order, an permission unit (204-2) which permits to execute a job when the user who has received notification instructs to execute a job, wherein when the user who has received notification does not instruct to execute a job for a predetermined period of time, the notification unit (204-4) notifies the next user in accordance with the use order.

12 Claims, 18 Drawing Sheets

FIG. 3

| RESERVATION NUMBER | NOTIFICATION DESTINATION | PASSWORD |
|---|---|---|
| 1 | 090-xxx-xxxx | abcd |
| 2 | 080-yyyy-yyyy | hijk |
|  |  |  |
|  |  |  |
|  |  |  |

| RESERVATION NUMBER | NOTIFICATION DESTINATION | PASSWORD |
|---|---|---|
| 1 | 090-xxx-xxxx | abcd |
| 2 | 080-yyyy-yyyy | hijk |
| 3 | 090-zzz-zzzz | pqrs |
|  |  |  |
|  |  |  |

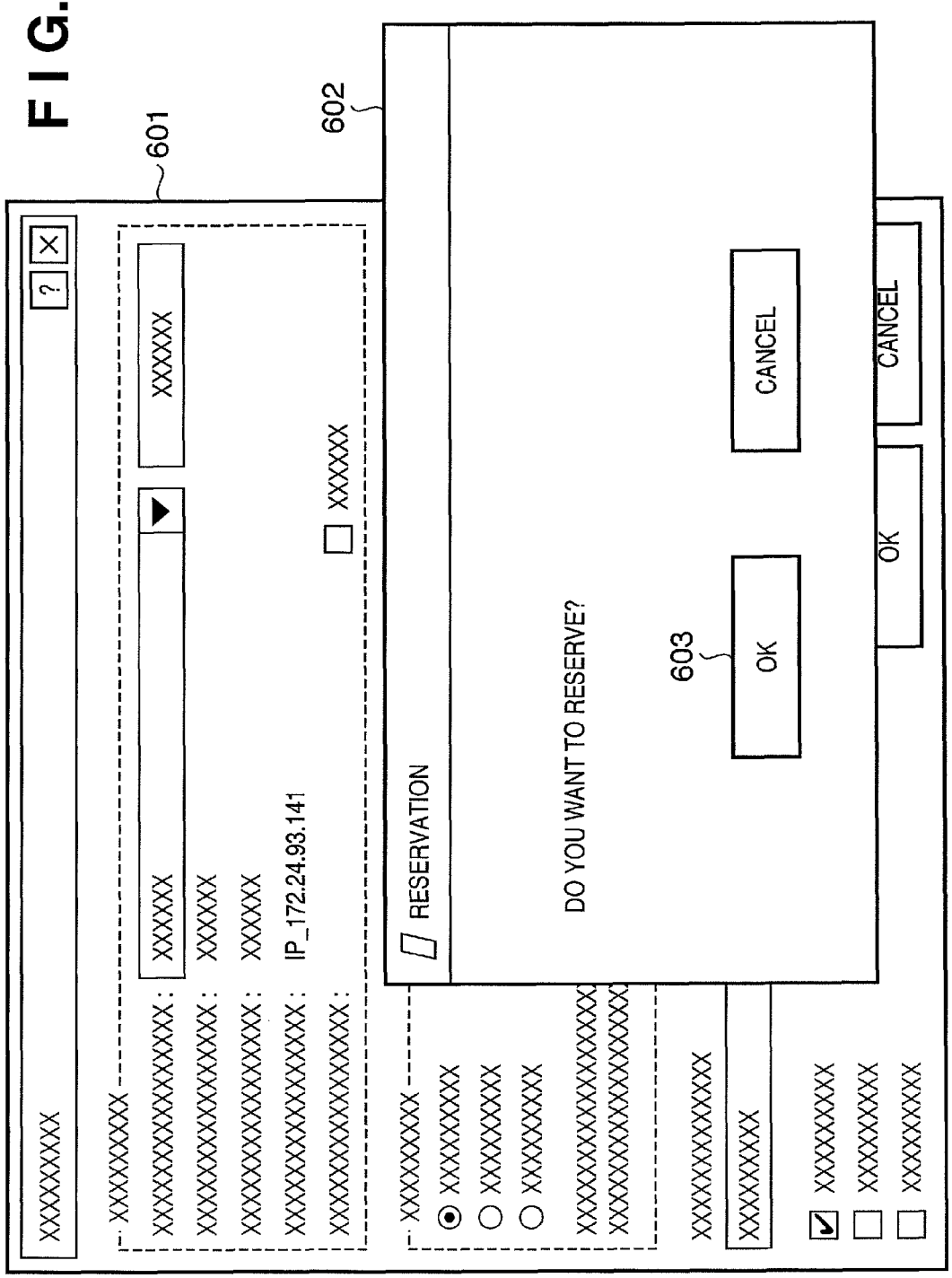

205

| RESERVATION NUMBER | NOTIFICATION DESTINATION | PASSWORD |
|---|---|---|
| 2 | 080-yyyy-yyyy | hijk |
| 3 | 090-zzz-zzzz | pqrs |
| | | |
| | | |
| | | |

205

| RESERVATION NUMBER | NOTIFICATION DESTINATION | PASSWORD |
|---|---|---|
| 2 | 080-yyyy-yyyy | hijk |
| 3 | 090-zzz-zzzz | pqrs |
| 1 | 090-xxx-xxxx | abcd |
|  |  |  |
|  |  |  |

INFORMATION PROCESSING APPARATUS, SYSTEM, AND METHOD THAT PROVIDE JOB RESERVATION WITH A TIME-OUT FEATURE

BACKGROUND OF THE INVENTION

1. Field of the Invention

The present invention relates to a processing technique for an information processing apparatus capable of deciding the use order of users when a plurality of users share and use the apparatus.

2. Description of the Related Art

In general, when a plurality of companies are on the same floor and share a single MFP (Multi Function Peripheral), the following security problems arise.

The first problem arises in executing a scan job. In the situation as described above, when a first user is using a scanner function to, e.g., copy, a second user has to wait near the MFP until the scanner function becomes available. This is because, in a scan job, the second user cannot put a job in a queue in advance, unlike in a print job. In this case, when these users belong to different companies, the second user of the other company is waiting near the user of a given company using the MFP. That is, the second user of the other company may see the output material of the given company, and therefore confidential information may leak.

Considering such a situation, the second user of may wait for the MFP from a distance until the scanner function becomes available. In this case, however, the second user cannot recognize as soon as the scanner function becomes available. In addition, a third user may use the MFP before the second user. This is inconvenient for the waiting user.

In scan job processing, a system is demanded which enables a user to recognize that the scanner function becomes available even he/she is away from the shared MFP, and the user can have the MFP exclusively to himself or herself while using it.

The second problem arises in print job processing. Even under the situation described above, in a print job, the user of the other company need not wait until the print function of the MFP becomes available. On the other hand, since a new job can be continuously put in a queue during processing of the previous job, jobs transmitted from different users coexist in the MFP. In such a case, confidentiality is not secured for each user.

In print job processing, a system is demanded which does not accept additional jobs, i.e., allows a user to have the MFP exclusively to himself or herself in printing a classified document.

Under such circumstances, Japanese Patent Application Laid-Open No. 2003-018337 proposes as a solution to the above problems a reservation system capable of reserving the use of the scanner function (capable of registering the use order of users in an environment wherein a plurality of users share an MFP).

According to Japanese Patent Application Laid-Open No. 2003-018337, a user can reserve the use of the scanner function by designating the user ID assigned to each user in advance. When the use of the scanner function is reserved, the MFP prohibits the execution of a new scan job, and only when a scan job designated with a predetermined user ID is input, cancels the prohibition of scan job execution.

With this reservation system, a user need not wait in front of the MFP in order to use the scanner function next, making the use of the MFP more convenient. After the scanner function is reserved, users other than the next in line are prohibited from executing a new job. Accordingly, the reserving user can have the MFP exclusively to himself or herself for a predetermined period of time, and security is guaranteed.

According to Japanese Patent Application Laid-Open No. 2003-018337, however, once a reservation is made, the above-described MFP does not permit the execution of a new job of another user until the reserving user uses the MFP. Therefore, when the reserving user who reserved the MFP leaves it unused for a while, no other user can use it at all even if the MFP is available. To solve this problem, a highly convenient system is desirable in which even when the reserving user leaves the MFP unused, another user can use it when he/she wants to use it.

On the other hand, the reserving user may leave the MFP unused for a while owing to unavoidable circumstances, e.g., an urgent matter. If the reservation is automatically canceled in this case, the reserving user needs to make a reservation again. This degrades the convenience. To solve this problem, it is desirable that even when the reserving user leaves the MFP unused for a predetermined period of time, the reservation is not automatically canceled and the user need not reserve the MFP again.

In addition, as described above, security is desirably warranted not only for a scan job but also for a print job.

SUMMARY OF THE INVENTION

The present invention has been made in consideration of the above problems, and has as its object to provide an information processing apparatus having a reservation function, which guarantees security of a job to be output by an execution instruction from each user and improves the convenience for each user.

In order to achieve the above object, an information processing apparatus according to the present invention has the following arrangement.

That is, an information processing apparatus capable of executing an input job, comprising:

acceptance unit configured to accept user information to identify a user;

decision unit configured to decide a use order of the information processing apparatus of each user based on an acceptance order of the user information;

notification unit configured to notify a user of permission to use the information processing apparatus in accordance with the use order; and permission unit configured to, when the user who has received notification from the notification unit instructs to execute a job, permit to execute the instructed job, wherein when the user who has received notification from the notification unit does not instruct to execute a job for a predetermined period of time, the notification unit notifies a next user, in accordance with the use order, of permission to use the information processing apparatus.

According to the present invention, an information processing apparatus having a reservation function can guarantee security of a job to be output by an execution instruction from each user and improve the convenience for each user.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of a management table;

FIG. 5 is a view showing another example of the management table;

FIGS. 6A and 6B are views each showing an example of a user interface upon reservation processing in an external apparatus;

DESCRIPTION OF THE EMBODIMENTS

Preferred embodiments of the present invention will now be described in detail in accordance with the accompanying drawings.

Note that the embodiments will exemplify an image processing apparatus as an information processing apparatus and an image processing system as an information processing system.

1. Hardware Configuration of Image Processing Apparatus

Figure 1:
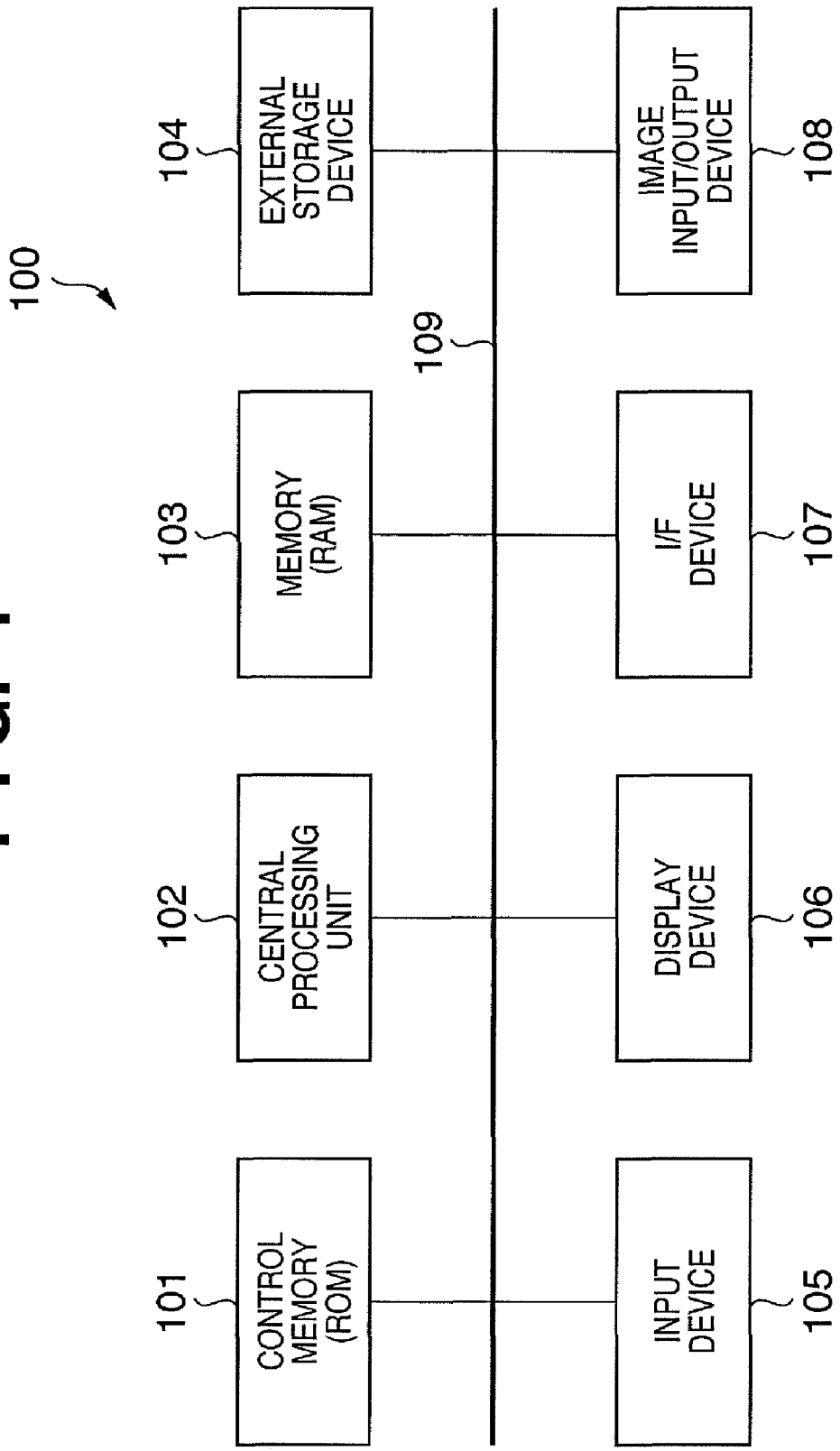
FIG. 1 is a block diagram showing the hardware configuration of an image processing apparatus 100 included in an image processing system according to an embodiment of the present invention.

FIG. 1 is a block diagram showing the hardware configuration of an image processing apparatus 100 included in an image processing system according to an embodiment of the present invention.

Referring to FIG. 1, reference numeral 101 denotes a control memory (ROM); 102, a central processing unit; 103, a memory (RAM); and 104, an external storage device. Reference numeral 105 denotes an input device (e.g., a keyboard, touch panel, or the like) to input various instructions from a user; and 106, a display device such as an LCD, display, or the like. Reference numeral 107 denotes an I/F device to communicate with an external apparatus to be described later; 108, an image input/output device including an image input device such as a scanner and an image output device such as a printer; and 109, a bus.

The control memory 101 stores a control program to implement various functions to be described later and data to be used for the control program. The control program and data are appropriately stored in the memory 103 through the bus 109 under the control of the central processing device 102 and executed by the central processing device 102.

The basic hardware configuration of the external apparatus (to be described later) included in the image processing system is the same as that of the above-described image processing apparatus 100, and the description thereof will be omitted hereinafter.

2. Functional Configuration of Image Processing System

Figure 2:
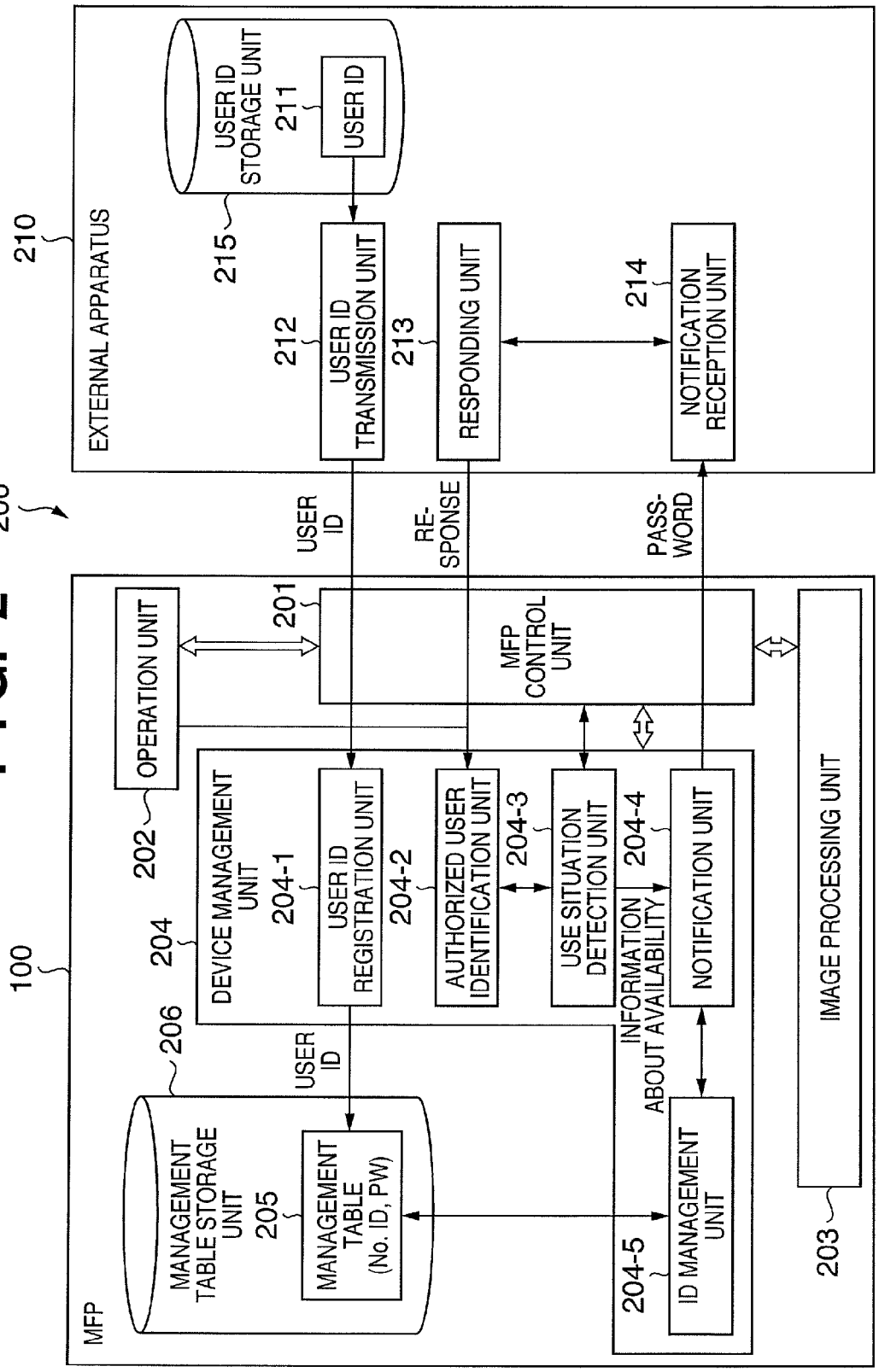
FIG. 2 is a functional block diagram schematically showing the configuration of the image processing system according to the embodiment of the present invention.

FIG. 2 is a functional block diagram schematically showing the configuration of an image processing system 200 according to the embodiment of the present invention. The image processing system 200 comprises the above-described image processing apparatus 100 and an external apparatus 210 communicably connected to the image processing apparatus 100 through a network. This embodiment will exemplify a case wherein an MFP (Multi Function Peripheral) is used as the image processing apparatus 100 (however, the image processing apparatus according to the present invention is not limited to the MFP).

The functional blocks of the MFP 100 will be described first. Reference numeral 203 denotes an image processing unit which has, e.g., a function of reading a paper document or the like by an image input device such as a scanner and performing image processing to the readout image data. The image processing unit 203 also has a print function of performing RIP processing to image data (mainly PDL data) input from the external apparatus 210 through the network and printing the processed image data by an image output device. In addition, the image processing unit 203 has various functions such as a box function, preview function, and FAX function.

Reference numeral 202 denotes an operation unit. A user can select the above-described function of the image processing unit 203 or input various instructions by using the operation unit 202. An MFP control unit 201 controls the image processing unit 203 and operation unit 202.

Reference numeral 204 denotes a device management unit which grasps and manages the use situation of the above-described functions. The MFP control unit 201 controls the device management unit 204 similar to the image processing unit 203 (the details of the device management unit 204 will be described later). Reference numeral 205 denotes a management table (to be described in detail later) which describes information about a user who reserved the use of the MFP 100. The management table 205 is stored in a management table storage unit 206 and managed by the device management unit 204.

The functional blocks of the external apparatus 210 will be described next. The external apparatus 210 is an information processing apparatus such as a PC (Personal Computer), cellular phone, or PDA. The external apparatus 210 transmits and receives various information required to operate the device management unit 204 of the MFP 100.

Reference numeral 212 denotes a user ID transmission unit which transmits a user ID 211 to the MFP 100 upon reserving the use of the MFP 100. A user ID storage unit 215 stores the user ID 211.

Reference numeral 214 denotes a notification reception unit which receives, together with a predetermined password, notification indicating that the turn to use the MFP 100 has come. Reference numeral 213 denotes a response unit which responds to the MFP 100 that the notification reception unit 214 received the password.

The above-described functional blocks of the external apparatus 210 may operate as part of an application executed in the external apparatus 210, or may operate in conjunction with the application.

FIG. 2 illustrates only one external apparatus for descriptive convenience. In the image processing system according to the present invention, however, a plurality of external apparatuses can be connected to the MFP 100.

3. Arrangement of Device Management Unit 204 of MFP 100

The functional arrangement of the device management unit 204 will be described with reference to FIG. 2.

The device management unit 204 has a reservation function using a user ID, a management function of managing the management table, a notification function of notifying a user when his/her turn to use the MFP 100 has come, and a user identification function of accepting the use of the MFP 100 by only a specific user. In order to implement these functions, the device management unit 204 has the following functional blocks.

Reference numeral 204-1 denotes a user ID registration unit. When the user ID registration unit 204-1 receives through the user ID transmission unit 212 the user ID 211 which is uniquely assigned to the external apparatus 210 in advance, it registers the received user ID in the management table 205 stored in the management table storage unit 206. That is, "reservation" in the image processing apparatus according to this embodiment indicates registration of a user ID in the management table 205. In this embodiment, a reservation order is decided in the order the user ID is accepted. A user ID is the identifier of the external apparatus to identify the user, e.g., the IP address, the computer name, or the telephone number of a cellular phone. The user ID is used as a notification destination to notify a user, together with a password (to be described later), that his/her turn to use the MFP 100 has come.

The management table storage unit 206 stores the management table 205 which is configured to show the order of reservations from a plurality of users. FIG. 3 shows an example of the management table 205. As shown in FIG. 3, the management table 205 registers user IDs from the upper row in the reservation order. The management table describes information such as a reservation number 301 and password 303 in addition to a notification destination 302 describing a received user ID. The reservation number 301 is sequentially assigned in the reservation order. The password 303 is always generated and assigned one by one when the user ID registration unit 204-1 registers a user ID in the management table 205.

Reference numeral 204-3 denotes a use situation detection unit which detects, in cooperation with the MFP control unit 201 which controls various functions of the MFP 100, whether a given function of the MFP 100 is currently used. When the use situation detection unit 204-3 detects that the given function is not being used, it notifies the notification unit 204-4 that the MFP 100 is available.

The notification unit 204-4 obtains information about the reserving user registered in the uppermost row of the management table 205 from the ID management unit 204-5 and notifies the notification destination 302 included in the obtained information that the MFP 100 has become available (the turn to use the MFP 100 has come). The notification unit 204-4 also notifies the notification destination 302 of the password 303 included in the obtained information at the same time.

Reference numeral 204-2 denotes an authorized user identification unit. After notification is made by the notification unit 204-4, the authorized user identification unit 204-2 prohibits a user whose turn has not come yet from using the MFP 100, thereby allowing the specific user to exclusively use the MFP 100. The authorized user identification unit 204-2 is set not to allow the use of the MFP 100 unless the password 303 notified to the notification destination (external apparatus 210) is input. With this arrangement, users other than the user who knows the password 303 cannot use the MFP 100.

4. Sequence of Reservation Acceptance Processing in Device Management Unit 204

Figure 4:
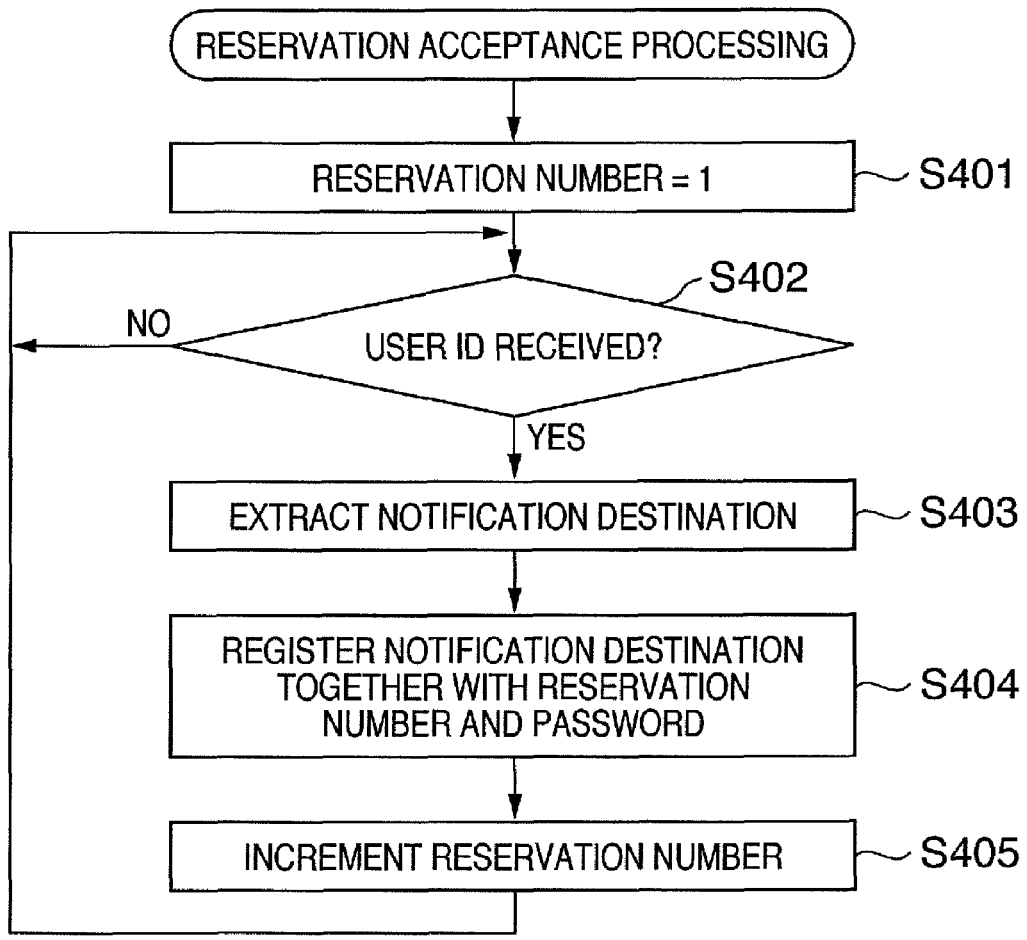
FIG. 4 is a flowchart showing the sequence of reservation acceptance processing in a device management unit.

The sequence of reservation acceptance processing in the device management unit 204 (mainly, user ID registration unit 204-1) will be described with reference to FIGS. 4 and 5. When reservation acceptance processing starts, the device management unit 204 sets the reservation number to 1 in step S401.

Next, in step S402, the device management unit 204 determines whether a user ID (i.e., information indicating a use reservation) is received from the external apparatus 210. If the device management unit 204 determines that the user ID is not received, it waits until it receives the user ID (NO in step S402).

If YES in step S402, the process advances to step S403 to extract a notification destination on the basis of the user ID. In step S404, the device management unit 204 registers the notification destination extracted in step S403 in the management table together with a password in correspondence with the reservation number (in this case, since the reservation number is set to 1, the notification destination and password are registered in correspondence with reservation number 1).

When the registration in the management table 205 is complete in step S404, the process advances to step S405 to increment the reservation number (in this case, the reservation number is set to 2).

In this manner, every time the device management unit 204 accepts a user ID, it registers the user ID from the upper row in the management table 205 in accordance with the order it is accepted.

FIG. 5 shows an example of the management table 205 in which three use reservations are made as the result of the reservation acceptance processing described above.

5. Reservation Processing in External apparatus 210

Figure 6B:
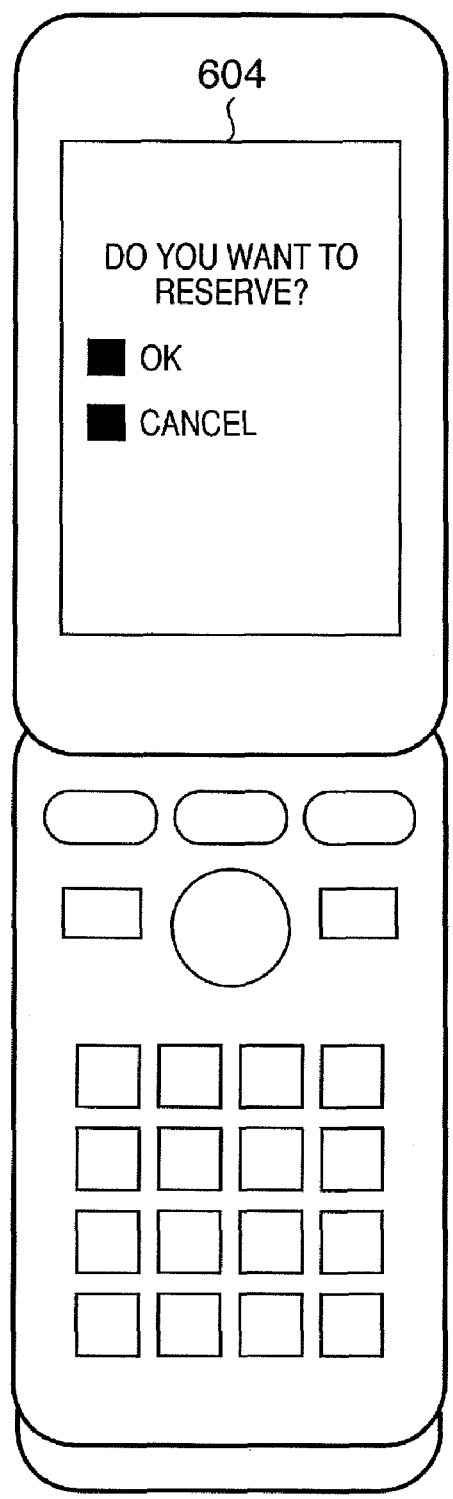

FIGS. 6A and 6B are views each showing an example of a user interface upon reservation processing in the external apparatus 210.

When the external apparatus 210 is, e.g., a PC (FIG. 6A), a window 601 is displayed in the display device upon starting a printer driver, and a "reservation button" is arranged on the window 601. When a user presses the reservation button, a confirmation window 602 is displayed.

When the user presses an OK button 603, the printer driver obtains the unique user ID 211 assigned to the PC and transmits it to the MFP 100, completing reservation.

When the external apparatus 210 is a cellular phone (FIG. 6B), a user accesses the MFP 100 from the cellular phone and makes a reservation through a homepage 604 provided by the MFP 100. At this time, the user inputs the telephone number from the cellular phone or reads out the user ID 211 registered in the user ID storage unit of the cellular phone, thereby transmitting the user ID from the external apparatus 210 to the MFP 100.

A PC and cellular phone are used as examples of the external apparatus 210 in this embodiment. However, another apparatus having a similar reservation homepage or utility is also available.

6. Notification Processing in Device Management Unit 204

Figure 7:
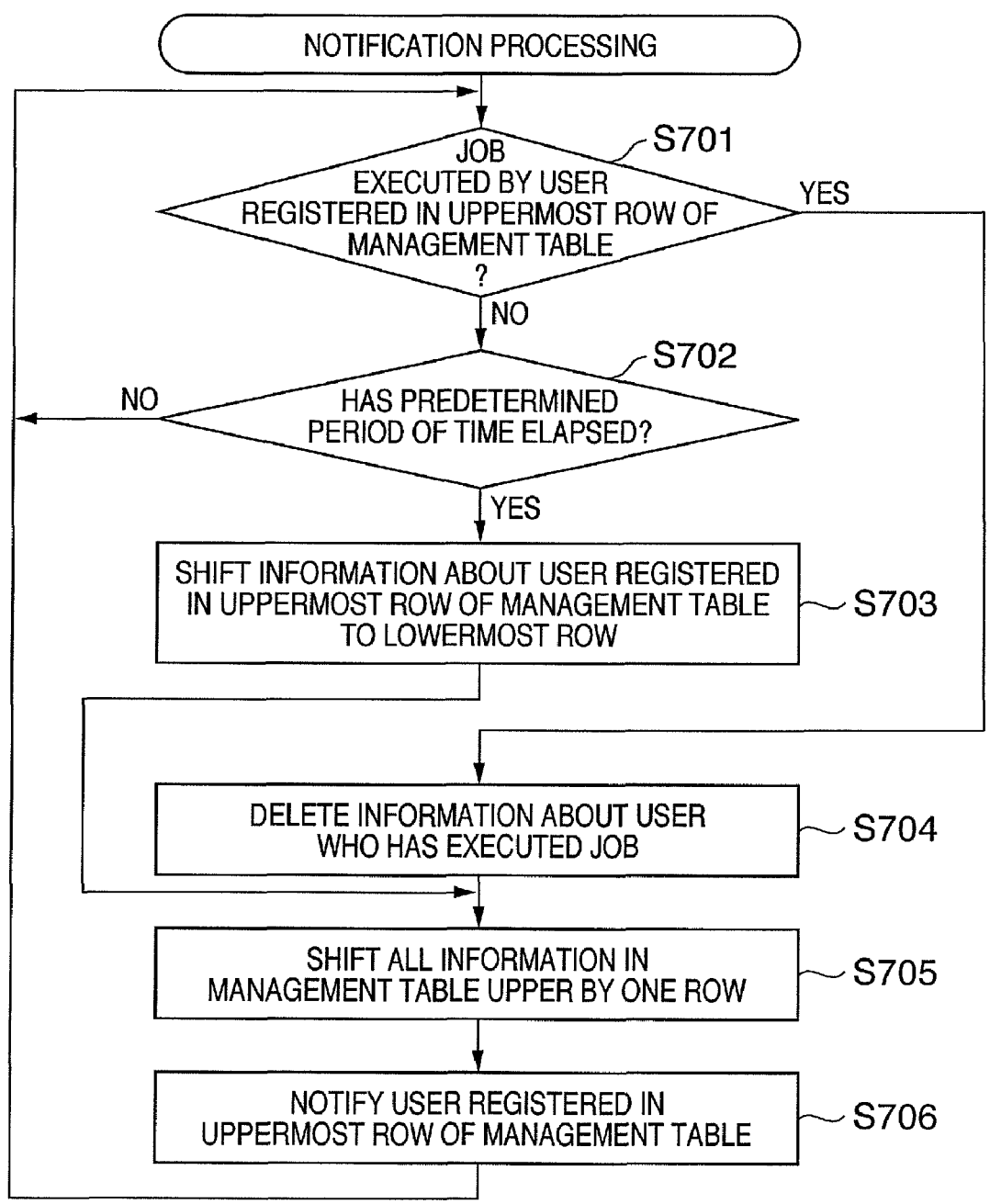
FIG. 7 is a flowchart showing the sequence of notification processing in the device management unit.

The sequence of notification processing in the device management unit 204 will be described with reference to FIG. 7. In step S701, the notification unit 204-4 determines based on the detection result of the use situation detection unit 204-3 whether the user registered in the uppermost row of the management table 205 has executed a job.

In this embodiment, the notification unit 204-4 determines that the job has been executed when the use situation detection unit 204-3 detects an instruction (completion instruction) indicating completion of the job execution is input by the user.

Figure 8:
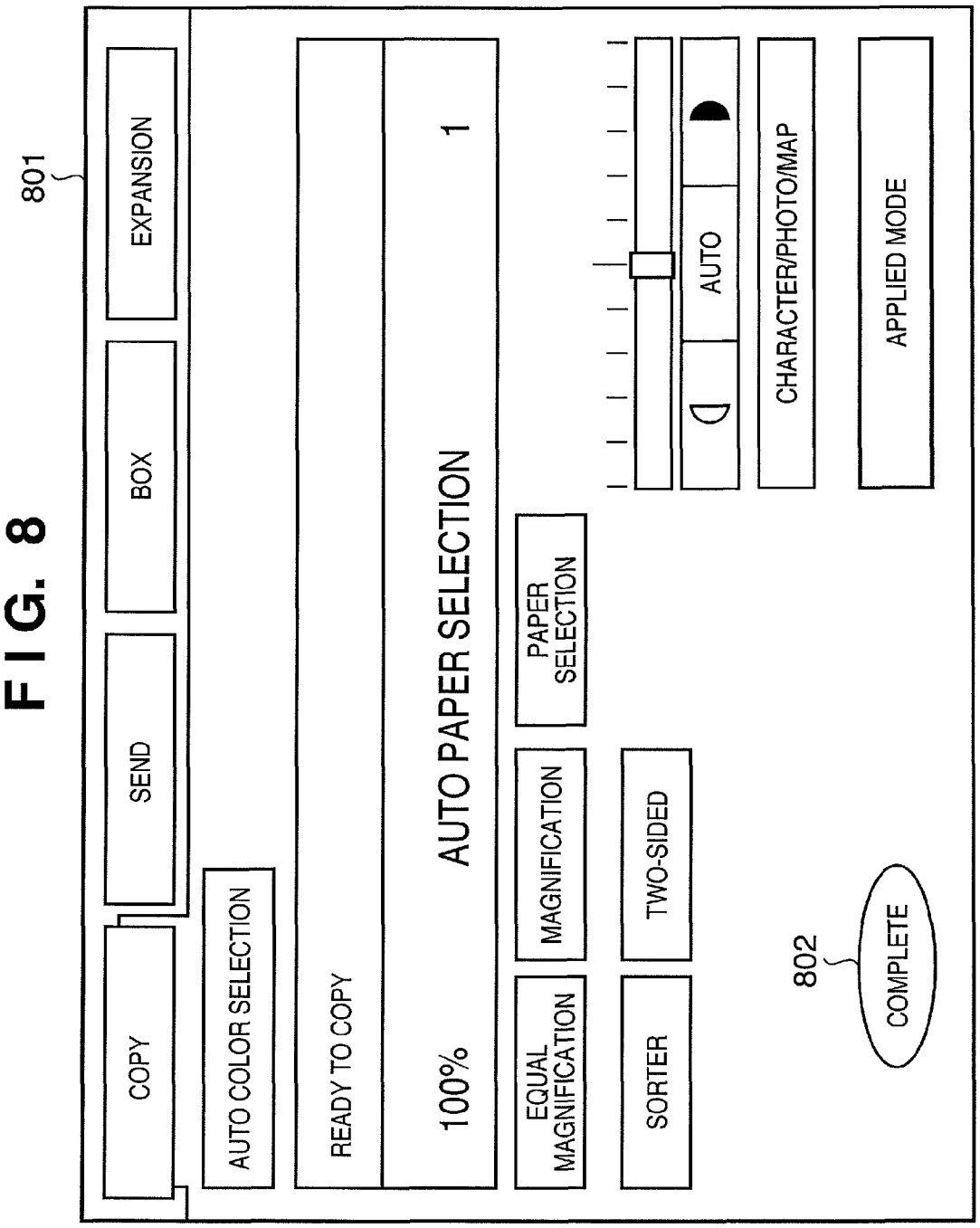
FIG. 8 is a view showing an example of a display window displayed in the operation unit of the MFP 100.

A completion instruction input method will be described with reference to FIG. 8. FIG. 8 shows an example of a display window displayed in the operation unit 202 of the MFP 100. The operation unit 202 comprises buttons to designate the functions of the MFP 100, e.g., copy, magnification, paper selection, and the like. In this embodiment, the operation unit 202 also comprises a completion button 802. When the user completes the use of the MFP 100, he/she presses the completion button 802. With this operation, the MFP 100 can recognize that nobody is using the MFP 100. The user may input a completion instruction not through the operation unit but through an application of the external apparatus 210.

Referring back to FIG. 7, when the notification unit 204-4 determines in step S701 that the user registered in the uppermost row of the management table 205 has executed the job, the process advances to step S704, and the ID management unit 204-5 deletes information about the user who has executed the job from the management table 205. In step S705, the remaining information registered in the management table 205 shifts upward by one row.

Figure 9:
FIG. 9 is a view showing still another example of the management table.

FIG. 9 is a view showing the management table after the information about the user previously registered in the uppermost row of the management table 205 is deleted and the remaining information shifts upward by one row. As shown in FIG. 9, the information of reservation number 1 is deleted and that of reservation number 2 shifts to the uppermost row of the management table 205.

In step S706, the device management unit 204 notifies the user newly registered in the uppermost row in step S705 that he/she is permitted to use the MFP 100. In the example of FIG. 9, the device management unit 204 notifies the notification destination "080-yyy-yyy" of reservation number 2 that the user is permitted to use the MFP 100 (simultaneously, transmits a password (hijk)).

After the notification in step S706, the process returns to step S701 again to repeat the process described above until all reserving users execute the jobs.

On the other hand, when the notification unit 204-4 determines in step S701 that the user registered in the uppermost row of the management table 205 has not executed the job yet, the process advances to step S702 to determine whether a predetermined period of time has elapsed. When NO in step S702, the process returns to step S701 to wait until the user (reservation number=1) registered in the uppermost row of the management table executes the job. Note that the predetermined period of time is set in the MFP 100 in advance.

When the user (reservation number=1) registered in the uppermost row in the management table 205 does not execute the job in the predetermined period of time, the process advances to step S703 to shift the information (reservation number=1) in the uppermost row to the lowermost row of the management table 205. After that, all information in the management table 205 shifts upward by one row in step S705.

Figure 10:
FIG. 10 is a view showing still another example of the management table.

FIG. 10 is a view showing a state in which the information in the uppermost row shifts to the lowermost row in step S703 and then all information in the management table 205 shifts upward by one row in step S705. As shown in FIG. 10, the information indicated by reservation number 1 which is previously registered in the uppermost row of the management table 205 shifts to the lowermost row of the management table 205, and the information indicated by reservation number 2 is registered in the uppermost row of the management table 205 instead.

In step S706, the device management unit 204 notifies the user newly registered in the uppermost row in step S705 that he/she is permitted to use the MFP 100. In the example of FIG. 10, the device management unit 204 notifies the notification destination "080-yyy-yyy" of reservation number 2 that the user is permitted to use the MFP 100 (simultaneously, transmits a password "hijk").

After the notification in step S706, the process returns to step S701 again to repeat the process described above until all reserving users execute the jobs.

As described above, even when a user makes a use reservation and is permitted to use the MFP 100, if he or she does not execute the job in a predetermined period of time, the reservation shifts to the last. As the result, no job which is left unexecuted for a long period of time disturbs other users in using the MFP 100.

In addition, a user who did not execute a job in the predetermined period of time need not make a reservation again since his/her turn comes after the current user. This is greatly convenient for the user.

As has been described above, in step S701 of FIG. 7, the notification unit 204-4 determines whether the job is executed, by determining whether the completion button 802 is pressed. Accordingly, when the user executed the job but forgot to press the completion button 802, the information about the user shifts to the lowermost row of the management table 205 after an elapse of a predetermined period of time.

The notification unit 204-4 determines whether the job is executed, by determining whether the completion button 802 is pressed because of the following reason. For example, a user wants to execute two print jobs. In this case, the user transmits the first print job to the MFP 100. After that, the user sets the print setting for the second print job through a driver and then transmits the second print job to the MFP 100. This creates an interval between the end of the first print job and the start of the second print job.

If the MFP 100 determines in step S701 whether a job is executed, by detecting that some processing for the job is done, the turn to use the MFP 100 may shift to the next reserving user before the current user transmits the second print job. This may happen particularly when "the predetermined period of time" in step S702 is short. In order to solve this problem, the user clearly announces the completion of the job by, e.g., pressing the completion button 802. With this notification, the MFP 100 determines whether the job is executed. In addition, a period of time equal to or more than that required to set the print setting is secured as "the predetermined period of time".

7. Notification Acceptance Processing in External Apparatus 210

Figure 11A:
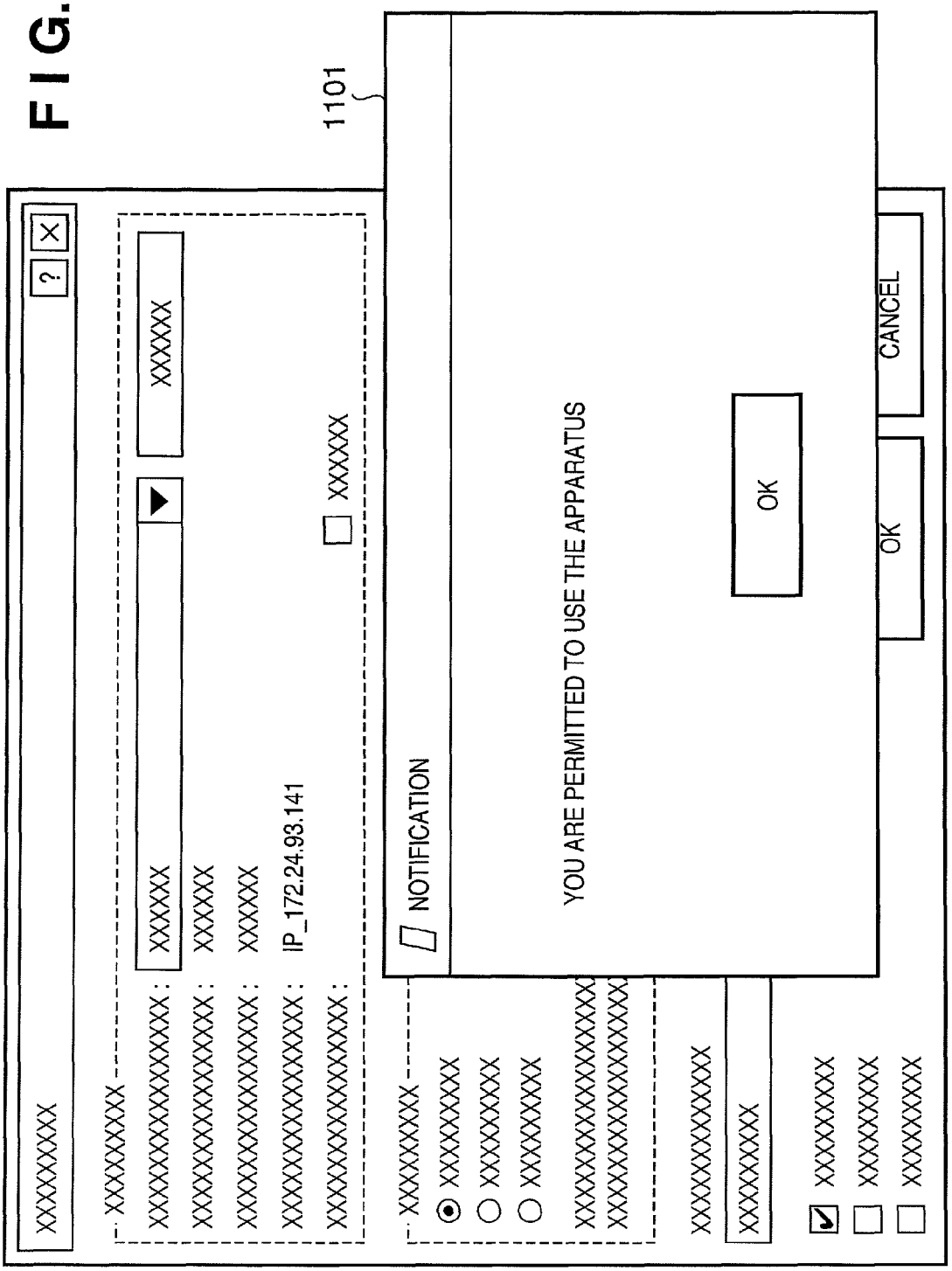
FIGS. 11A and 11B are views each showing an example of notification received by the external apparatus upon permission to use the MFP.
Figure 11B:
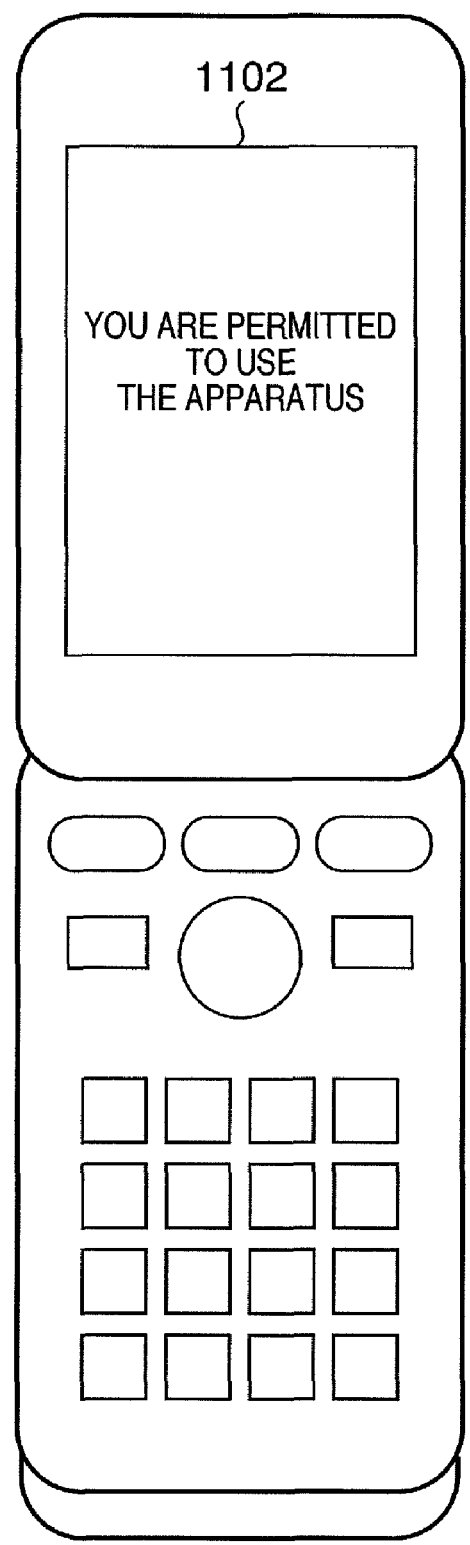

FIGS. 11A and 11B are views each showing an example of notification received by the external apparatus 210 when the use of the MFP 100 is permitted. This notification is made when the reserving user's turn to use the MFP 100 has come.

When the external apparatus 210 is, e.g., a PC (FIG. 11A), a window 1101 as shown in FIG. 11A automatically appears upon receiving the notification. When the external apparatus 210 is a cellular phone (FIG. 11), the cellular phone receives a message or a window 1102 appears.

<Sequence of Authorized User Identification Processing in Device Management Unit 204>

The sequence of authorized user identification processing in the device management unit 204 (mainly, authorized user identification unit 204-2) will be described with reference to FIGS. 12A and 12B.

Figure 12A:
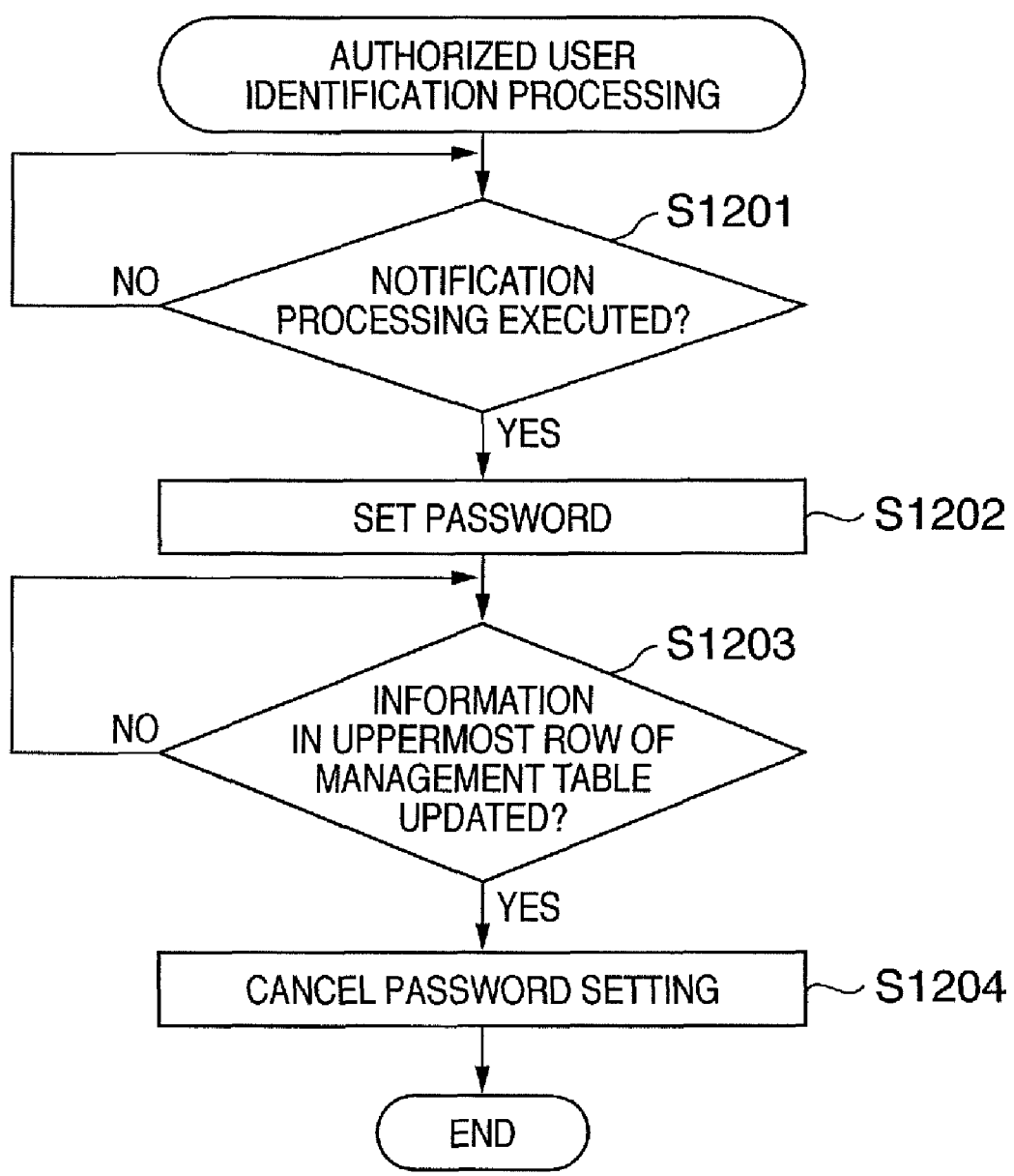
FIGS. 12A and 12B are flowcharts each showing the sequence of authorized user identification processing in the device management unit.

As shown in FIG. 12A, in step S1201, the device management unit 204 determines whether the notification unit 204-4 executes notification processing.

If YES in step S1201, the process advances to step S1202 to set in the authorized user identification unit 204-2 a password transmitted to the notification destination upon the notification processing. With this operation, no job will be executed unless the set password is input. That is, the user of the notification destination who receives the password can exclusively use the MFP 100.

In step S1203, the device management unit 204 determines whether the information in the uppermost row of the management table 205 is updated. It is determined that the information in the uppermost row of the management table 205 is updated when the user registered in the uppermost row of the management table 205 executes the job, the information about the user is deleted, and then the information with next reservation number shifts to the uppermost row of the management table 205. The same determination is made when the user registered in the uppermost row of the management table does not execute the job in a predetermined period of time, and therefore the information about the user shifts to the lowermost row of the management table 205 and the information with next reservation number shifts to the uppermost row of the management table 205.

If YES in step S1203, the process advances to step S1204 to cancel the password setting and terminate processing.

Figure 12B:
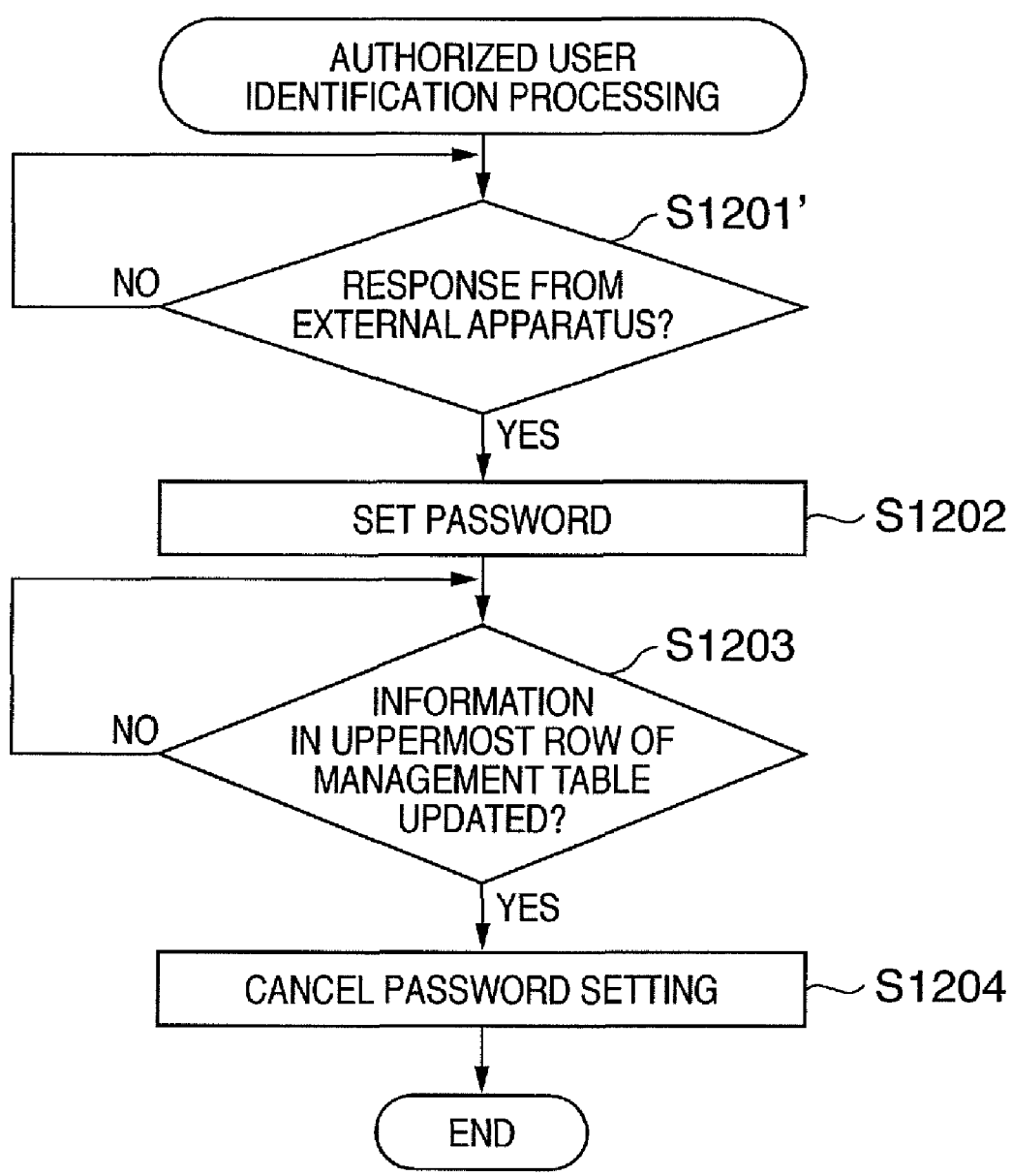

Authorized user identification processing is not limited to the flowchart shown in FIG. 12A, and can be executed in accordance with the flowchart shown in FIG. 12B. FIG. 12A is different from FIG. 12B in step S1201 (S1201').

More specifically, in FIG. 12A, the device management unit 204 sets the password when the notification unit 204-4 executes notification processing. On the other hand, in FIG. 12B, the device management unit 204 sets the password when the notification unit 204-4 executes notification processing and the device management unit 204 receives a response to the notification from the external apparatus 210. That is, a specific user can exclusively use the MFP 100 after the device management unit 204 receives a response from the external apparatus 210.

In other words, during the period after the notification unit 204-4 gives notification until a response from the external apparatus 210 is received, a given user can use the MFP 100 regardless of the presence/absence of any reservation.

8. First Embodiment of Image Processing System 200

Figure 13:
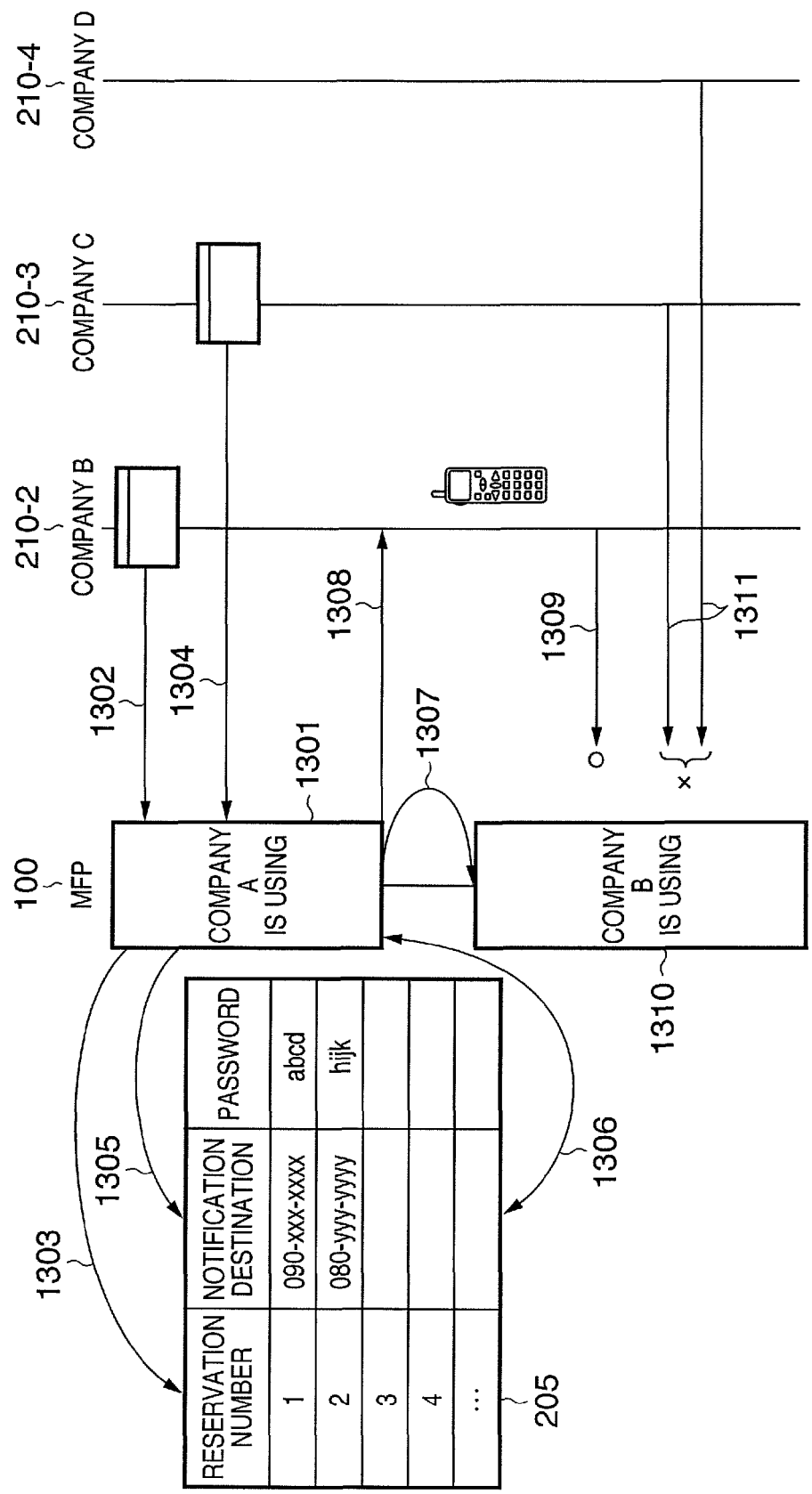
FIG. 13 is a view showing the first embodiment of the image processing system.

FIG. 13 is a view showing the first embodiment of the image processing system 200 described above.

An external apparatus 210-1 (not shown) of a company A, an external apparatus 210-2 of a company B, an external apparatus 210-3 of a company C, and an external apparatus 210-4 of a company D share an MFP 100, and the external apparatus 210-1 of the company A is currently using the MFP 100 (1301).

The external apparatus 210-2 of the company B has a material to print by the MFP 100. In this case, the external apparatus 210-2 of the company B transmits a user ID to reserve the use of the MFP 100 via the application (1302). When the MFP 100 receives the user ID, it generates a unique password and registers it in a management table 205 together with a reservation number and the received user ID (1303). The management table 205 is as described in FIG. 3.

Next, the external apparatus 210-3 of the company C has a material to copy by the MFP 100. In this case, the external apparatus 210-3 of the company C transmits a user ID to reserve the use of the MFP 100 via the application (1304). When the MFP 100 receives the user ID, it generates a unique password and registers it in the management table 205 together with a reservation number and the received user ID (1305).

The MFP 100 makes a use situation detection unit 204-3 check whether the MFP 100 is in use. In order to recognize that the MFP 100 becomes available, the user must input a completion instruction indicating the completion of using the MFP 100. The user inputs the completion instruction through the operation unit of the MFP 100 or the application of the external apparatus 210-1.

When the completion instruction is input by the user, it is transmitted to the use situation detection unit 204-3 through the MFP control unit 201. Upon reception of it, the management table 205 is updated.

When the external apparatus 210-1 of the company A finishes using the MFP 100 and the user inputs a completion instruction from an operation unit 202, the MFP 100 deletes the information (information of the external apparatus 210-1 of the company A) in the uppermost row of the management table 205 and obtains the information about the next reserving user (1306).

The MFP 100 sets the password included in the obtained information in an authorized user identification unit 204-2 (1307) and notifies of the password the notification destination included in the information (1308). The notification result is as described in FIGS. 11A and 11B. At this time, the external apparatus 210-2 of the company B which received the notification can use the MFP 100 anytime by inputting the password (1309 and 1310). On the other hand, since the external apparatus 210-3 of the company C and the external apparatus 210-4 of the company D do not know the password, they cannot use the MFP 100 (unauthorized state) (1311).

9. Second Embodiment of Image Processing System 200

Figure 14:
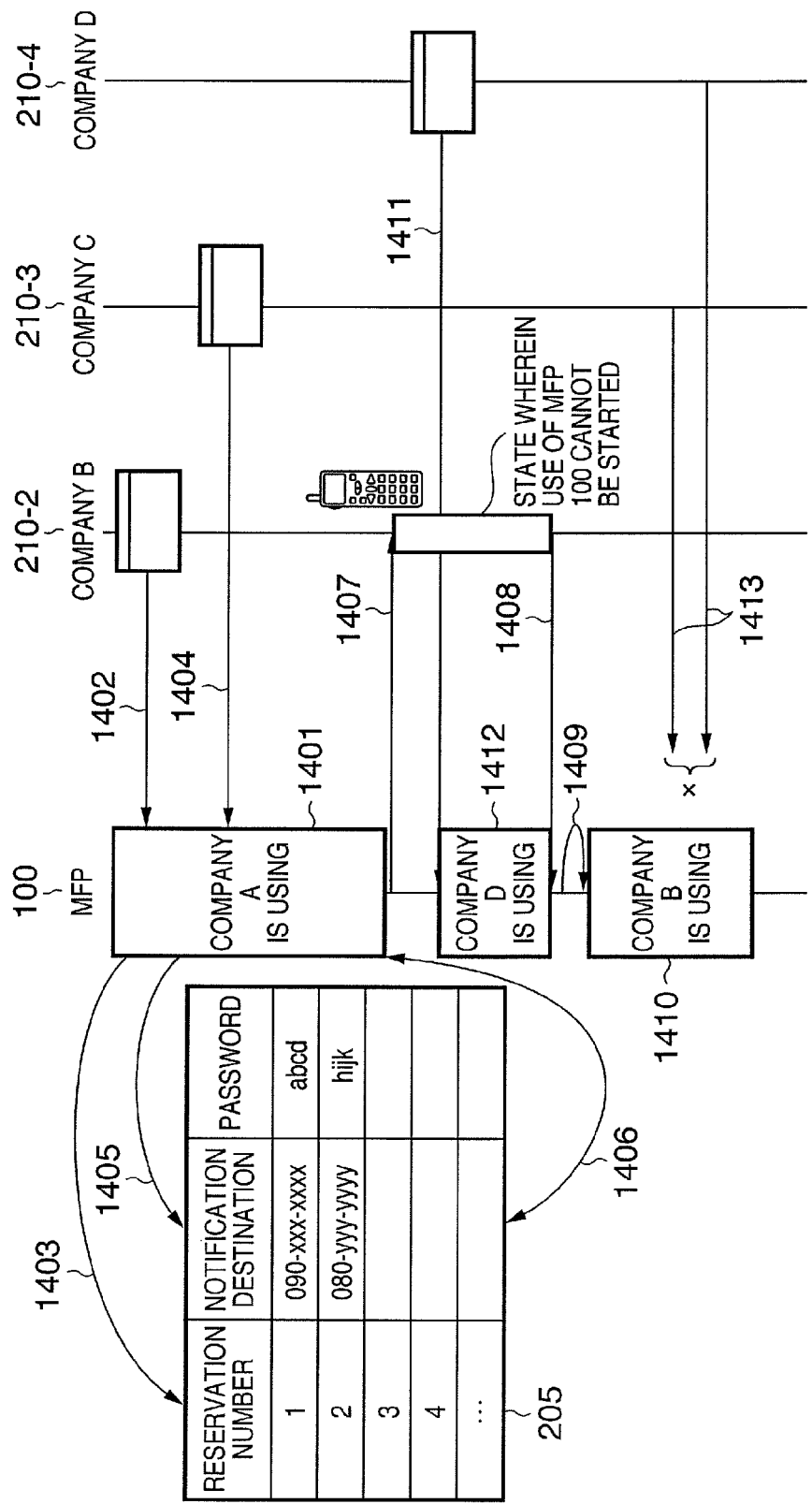
FIG. 14 is a view showing the second embodiment of the image processing system.

The second embodiment of the image processing system 200 will be described with reference to FIG. 14. FIG. 14 is a view showing the second embodiment.

An external apparatus 210-1 (not shown) of a company A, an external apparatus 210-2 of a company B, an external apparatus 210-3 of a company C, and an external apparatus 210-4 of a company D share an MFP 100, and the external apparatus 210-1 of the company A is currently using the MFP 100 (1401).

The external apparatus 210-2 of the company B has a material to print by the MFP 100. In this case, the external apparatus 210-2 of the company B transmits a user ID to reserve the use of the MFP 100 via the application (1402). When the MFP 100 receives the user ID, it generates a unique password and registers it in a management table 205 together with a reservation number and the received user ID (1403). The management table 205 is as described in FIG. 3.

Next, the external apparatus 210-3 of the company C has a material to copy by the MFP 100. In this case, the external apparatus 210-3 of the company C transmits a user ID to reserve the use of the MFP 100 via the application (1404). When the MFP 100 receives the user ID, it generates a unique password and registers it in the management table 205 together with a reservation number and the received user ID (1405).

The MFP 100 makes a use situation detection unit 204-3 check whether the MFP 100 is in use. The user inputs a completion instruction indicating that he/she finished using the MFP 100 through an operation unit 202 of the MFP 100 described in FIG. 8 or the application of the external apparatus 210-1. When the completion instruction is input by the user, it is transmitted to the use situation detection unit 204-3 through an MFP control unit 201. Upon receiving it, the management table 205 is updated.

When the external apparatus 210-1 of the company A finishes using the MFP 100, the MFP 100 deletes the information (information of the external apparatus 210-1 of the company A) in the uppermost row of the management table 205. The MFP 100 then obtains the information about the next reserving user and notifies of a password the external apparatus 210-2 serving as the notification destination included in the information (1407). The notification result is as described in FIGS. 11A and 11B.

The external apparatus 210-2 of the company B which receives the notification responds to the MFP 100 when it is actually ready to use the MFP 100 (1408). When the MFP 100 receives the response, it sets the password corresponding to the response source in an authorized user identification unit 204-2 (1409). Accordingly, the devices other than the external apparatus 210-2 of the company B cannot use the MFP 100 (unauthorized state) since they do not know the password (1410 and 1413).

As described above, in the second embodiment, the external apparatus 210-2 responds to the MFP 100 when it is actually ready to use the MFP 100, and after that, the password is set in the authorized user identification unit. This arrangement provides the following merits.

For example, when the external apparatus 210-2 of the company B is permitted to use the MFP 100 but is not ready to use it, the MFP 100 is left unused for a while. If the MFP 100 cannot be used even while it is available, no other user can use it even if he/she wants to use it, wasting time. To solve this problem, the password is set after the response is received. With this arrangement, another user, e.g., the external apparatus 210-4 of the company D can use the MFP 100 until the external apparatus 210-2 responds (1411 and 1412).

10. Third Embodiment of Image Processing System 200

Figure 15:
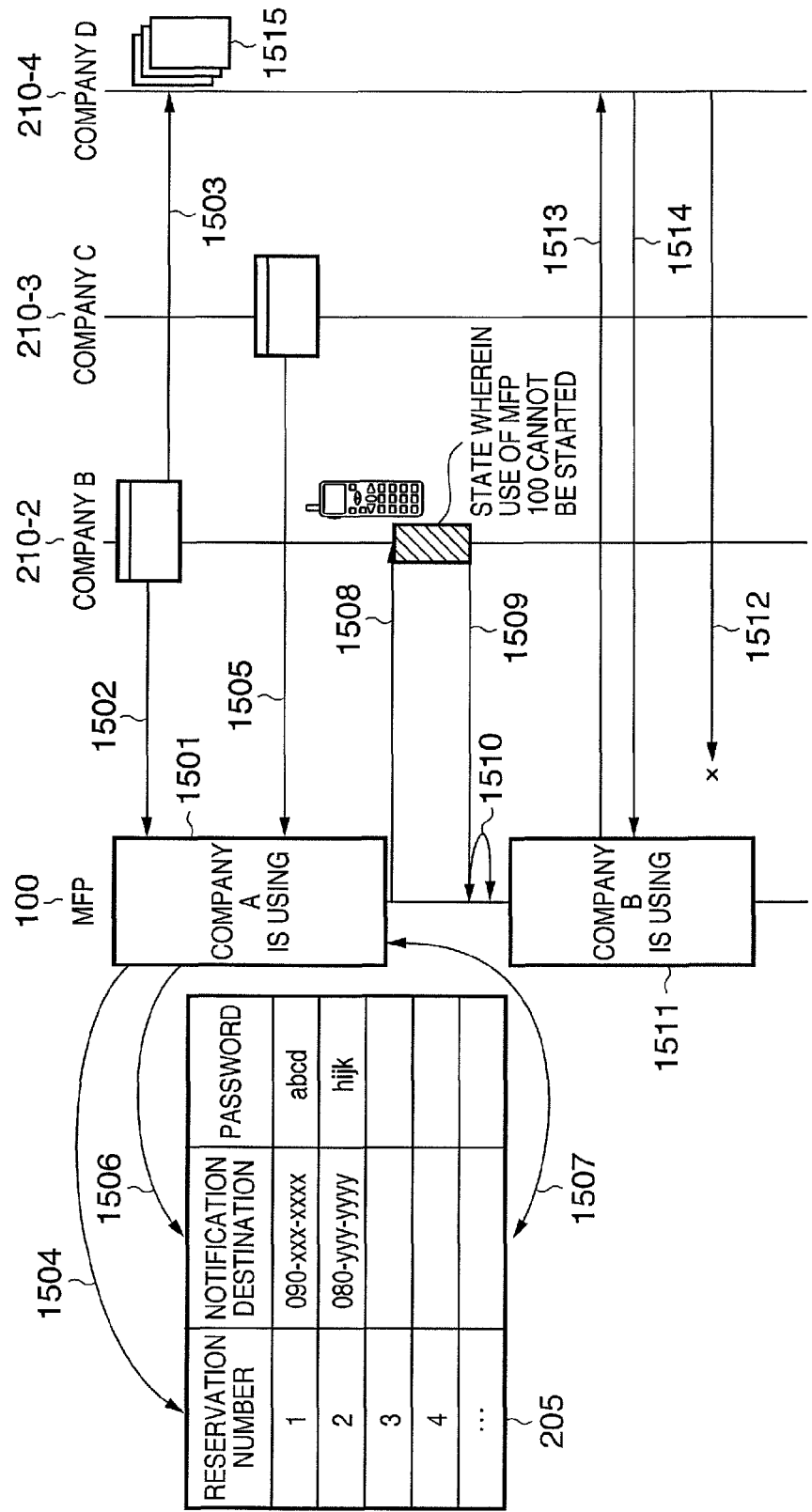
FIG. 15 is a view showing the third embodiment of the image processing system.

The third embodiment of the image processing system 200 will be described with reference to FIG. 15. FIG. 15 is a view showing the third embodiment.

An external apparatus 210-1 (not shown) of a company A, an external apparatus 210-2 of a company B, an external apparatus 210-3 of a company C, and an external apparatus 210-4 of a company D share an MFP 100, and the external apparatus 210-1 of the company A is currently using the MFP 100 (1501).

The external apparatus 210-2 of the company B has a material to print by the MFP 100. In this case, the external apparatus 210-2 of the company B transmits a user ID to reserve the use of the MFP 100 via the application (1502). Simultaneously, in a print job, print data is transmitted not to the MFP 100 but to a server 1500 (1503).

When the MFP 100 receives the user ID, it generates a unique password and registers it in a management table 205 together with a reservation number and the received user ID (1504). The management table 205 is as described in FIG. 3.

Next, the external apparatus 210-3 of the company C has a material to copy by the MFP 100. In this case, the external apparatus 210-3 of the company C transmits a user ID to reserve the use of the MFP 100 via the application (1505). In a copy job, no print data is transmitted to the server 1500. When the MFP 100 receives the reservation, it generates a unique password and registers it in the management table 205 together with a reservation number and the received user ID (1506).

The MFP 100 makes a use situation detection unit 204-3 check whether the MFP 100 is in use. The user inputs a completion instruction indicating that he/she finished using the MFP 100 through an operation unit 202 of the MFP 100 described in FIG. 8 or the application of the external apparatus 210-1. When the completion instruction is input by the user, it is transmitted to the use situation detection unit 204-3 through an MFP control unit 201. Upon receiving it, the management table 205 is updated.

When the external apparatus 210-1 of the company A finishes using the MFP 100, the MFP 100 deletes the information (information of the external apparatus 210-1 of the company A) in the uppermost row of the management table 205. The MFP 100 then obtains the information about the next reserving user and notifies of a password the external apparatus 210-2 serving as the notification destination included in the information (1508). The notification result is as described in FIGS. 11A and 11B.

The external apparatus 210-2 of the company B which receives the notification responds to the MFP 100 when it is actually ready to use the MFP 100 (1509). When the MFP 100 receives the response, it sets the password corresponding to the response source in an authorized user identification unit 204-2 (1510). Accordingly, the devices other than the external apparatus 210-2 of the company B cannot use the MFP 100 (unauthorized state) since they do not know the password (1511 and 1512).

When the external apparatus 210-2 of the company B designates where the print data transmitted upon reservation is stored, print data 1515 stored in the server 1500 is printed (1513 and 1514). In the third embodiment, since print data is transmitted to the server 1500 upon reservation, it is possible to save labor to operate the external apparatus 210-2 in order to transmit the print data when the data is actually used.

As is apparent from the above description, according to this embodiment, it is possible to reserve the image processing apparatus using the user ID. With this arrangement, a user can exclusively use the image processing apparatus even when there are many users to use the apparatus.

In addition, the user receives notification when his/her turn has come. Accordingly, the user can know that the image processing apparatus has become available even when the user is away from the image processing apparatus.

The user permitted to use the image processing apparatus is identified using the password. Accordingly, it is possible to avoid interruption by another user after receiving the notification indicating that the reserving user's turn has come, and the reserving user can exclusively use the apparatus for a period of time. Since no user who does not know the password can use the image processing apparatus, confidentiality can be secured in both a scan job and print job.

A user who is authorized to use the image processing apparatus is determined after the user responds to the notification from it. With this arrangement, another user can use the image processing apparatus up to immediately before the user whose turn has come starts using it. Conventionally, when the user whose turn to use the image processing apparatus has come but is not ready to use it leaves it unused, no one else can use the apparatus because he or she is unauthorized to do so. In this embodiment, however, this can be avoided and the image processing apparatus can be utilized.

When the image processing apparatus is not used even after a predetermined period of time has elapsed, the management table is updated to shift the reservation to the last. With this arrangement, even when the reserving user leaves the apparatus unused for a predetermined period of time, the reservation is not automatically canceled and the user need not make a reservation again. This improves the user's convenience.

11. Other Embodiments

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is implemented even by supplying a storage medium recording software program codes for implementing the functions of the above-described embodiments to a system or an apparatus. In this case, the functions described above are implemented by causing the computer (or a CPU or an MPU) of the system or the apparatus to read out and execute the program codes stored in the storage medium. In this case, storage medium storing the program codes constitutes the present invention.

As storage medium for supplying the program codes, a Floppy® disk, a hard disk, an optical disk, a magnetooptical disk, a CD-ROM, a CD-R, a magnetic tape, a nonvolatile memory card, a ROM, or the like can be used.

The functions of the above-described embodiments are implemented not only when the readout program codes are executed by the computer. For example, the functions of the above-described embodiments are also implemented when the OS (Operating System) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer. More specifically, the functions of the above-described embodiments are also implemented when, after the program codes are written in the memory, the CPU of the function expansion board or function expansion unit performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-351311, filed Dec. 5, 2005, which is hereby incorporated by reference herein in its entirety.

What is claimed is:

1. An information processing apparatus for executing a job, the information processing apparatus comprising:
a communication device configured to communicate with an external apparatus; and
a controller configured to:
decide an order of users requesting use of the information processing apparatus in accordance with user information for identifying a user, which user information is received by said communication device;
control said communication device to notify an external apparatus associated with one user of a permission to use the information processing apparatus in accordance with the decided order;
enable the information processing apparatus to execute a job instructed by another user who has not received the permission to use the information processing apparatus and is different from the one user who has received the permission, after said communication device notifies the external apparatus associated with the one user of the permission and before said communication device receives a response to the permission from the external apparatus associated with the one user;
prohibit the information processing apparatus from executing the job instructed by the another user, after said communication device receives the response to the permission from the external apparatus associated with the one user;
control the information processing apparatus to execute a job instructed by the one user who has received the permission, after said communication device receives the response to the permission from the external apparatus associated with the one user; and
control said communication device to notify an external apparatus associated with a next user of a permission to use the information processing apparatus, in accordance with the decided order.

2. The apparatus according to claim 1, wherein said controller is further configured to change the decided order if the one user who has received the permission does not instruct to execute the job within a predetermined period of time.

3. The apparatus according to claim 1, wherein said controller is further configured to:
register the user information received by said communication device in a table, wherein the table stores the user information of each user, the order of the user information stored in the table indicating the decided order; and
delete, if the execution of the job instructed by the one user who has received the permission is completed, the one user information of the one user from the table.

4. The apparatus according to claim 3, further comprising:
an input device configured to input completion of the execution of the job from the one user who has received the permission,
wherein, if said input device inputs the completion of the execution of the job from the user who has received the permission, said controller deletes the user information of the one user from the table.

5. The apparatus according to claim 1, wherein said controller is further configured to:
issue a password to the user in accordance with the decided order,
wherein said communication device notifies the external apparatus associated with the one user of the permission and a corresponding password.

6. The apparatus according to claim 5, further comprising:
a password acceptance unit configured to accept a password,
wherein if the password accepted by said password acceptance unit corresponds to the password notified by said communication device, said controller controls the information processing apparatus to execute the job instructed by the one user who has received the permission.

7. The apparatus according to claim 1, wherein if the one user who has received the permission dose not instruct to execute the job within a predetermined period of time, said controller controls said communication device to notify the next user, in accordance with the order decided by said decision unit, of the permission to use the information processing apparatus.

8. The apparatus according to claim 1, further comprising:
a printing unit configured to print an image,
wherein the one user who has received the permission instructs to execute a print job.

9. The apparatus according to claim 1, wherein:
said communication device also notifies a password corresponding to the permission, and
after receiving the response to the permission, said controller sets the password notified by said communication device as a password for specifying the one user who has received the permission notice.

10. An information processing method for an information processing apparatus for executing a job, the information processing method comprising the steps of:
accepting user information to identify a user;
deciding an order of users requesting use of the information processing apparatus based on the acceptance of the user information;
notifying one user of permission to use the information processing apparatus in accordance with the order decided in the deciding step;
executing a job instructed by another user who has not received the permission to use the information processing apparatus and is different from the one user who has received the permission, after notifying the one user of the permission and before receiving a response to the permission from the one user;
receiving the response to the permission from the one user;
prohibiting the another user from using the information processing apparatus, when the response to the permission from the one user has been received;
executing a job instructed by the one user who has received the permission; and
notifying a next user of the permission to use the information processing apparatus in accordance with the order decided in the deciding step, if the job instructed by the one user who has received the permission is executed in the executing step.

11. A non-transitory computer-readable storage medium storing a control program executable by a computer to implement the method according to claim 10.

12. An information processing apparatus for executing a job, the information processing apparatus comprising:
a notification device configured to notify a user of a permission to use the information processing apparatus; and
a controller configured to:
decide an order of users requesting use of the information processing apparatus;
control said notification device to notify one user of a permission to use the information processing apparatus in accordance with the decided order;
enable the information processing apparatus to execute a job instructed by another user who has not received the permission to use the information processing apparatus and is different from the one user who has received the permission, after notifying the one user of the permission and before receiving a response to the permission from the one user;
control the information processing apparatus to execute the job instructed by the one user who has received the permission after receiving the response to the permission from the one user; and
control said notification device to notify a next user of a permission to use the information processing apparatus, in accordance with the decided order.

* * * * *